(12) United States Patent
Tahara et al.

(10) Patent No.: US 6,241,053 B1
(45) Date of Patent: Jun. 5, 2001

(54) VENTILATED DISC BRAKE ROTOR

(75) Inventors: Hiromitsu Tahara, Kanagawa; Tetsuro Aoki, Tochigi, both of (JP)

(73) Assignee: Kiriu Machine MFG. Co., Ltd., Kiryu (JP)

(*) Notice: Subject to any disclaimer, the term of this patent is extended or adjusted under 35 U.S.C. 154(b) by 0 days.

(21) Appl. No.: 09/325,664

(22) Filed: Jun. 4, 1999

(51) Int. Cl.[7] .................................................. F16D 55/02
(52) U.S. Cl. .............................. 188/71.6; 188/218 XL; 188/264 AA
(58) Field of Search ................... 188/71.6, 218 XL, 188/264 AA, 264 A

(56) References Cited

U.S. PATENT DOCUMENTS

| | | | |
|---|---|---|---|
| 5,706,915 | * | 1/1998 | Shimazu et al. ............... 188/218 XL |
| 6,032,769 | * | 3/2000 | Daudi ............................ 188/218 XL |

FOREIGN PATENT DOCUMENTS

| | | | |
|---|---|---|---|
| 4323782 | * | 1/1994 | (DE) ............................. 188/218 XL |
| 5321959 | * | 12/1993 | (JP) ............................. 188/218 XL |
| 6-129452 | | 5/1994 | (JP) . |
| 6249274 | * | 9/1994 | (JP) ............................. 188/218 XL |
| 8074900 | * | 3/1996 | (JP) ............................. 188/218 XL |
| 10-318302 | | 12/1998 | (JP) . |
| 11287268 | * | 10/1999 | (JP) ............................. 188/218 XL |

\* cited by examiner

*Primary Examiner*—Robert J. Oberleitner
*Assistant Examiner*—Devon Kramer
(74) *Attorney, Agent, or Firm*—Foley & Lardner

(57) ABSTRACT

A ventilated disc brake rotor has first and second discs separated by radially extending ribs. The first disc has a thin wall section, and a peripheral thick wall section having an increased wall thickness increased by a raised portion raised from the inside surface of the first disc toward the second disc. The thick wall section extends radially from the outer periphery over a radial range of about ⅓ of the radial width of the braking friction surface of the first disc.

20 Claims, 7 Drawing Sheets

VENTILATED DISC BRAKE ROTOR

BACKGROUND OF THE INVENTION

The present invention relates to disc brakes and more specifically ventilated rotors or discs for disc brakes.

The recent demand for better fuel efficiency and weight reduction of motor vehicles involves the demand for more light-weight brake units.

For reducing the weight of a ventilated rotor (or disc) having two parallel discs, the reduction of wall thicknesses of the discs is effective. However, thin wall discs may adversely influence the heat absorbing performance and braking performance. In particular, this tendency is strong in front disc brakes which must bear 60~80% of the braking load of a vehicle.

Japanese Patent Kokai Publication No. 6(1994)–129452 and Japanese Patent Kokai Publication No. 8(1996)–74900 disclose ventilated rotors having tapered inside surfaces designed to improve the cooling efficiency.

SUMMARY OF THE INVENTION

It is an object of the present invention to provide ventilated rotors having improved thermal properties to achieve the weight reduction without sacrificing the braking performance.

According to illustrated embodiments of the present invention, a ventilated disc brake rotor comprises first and second discs and a plurality of radial ribs.

The first disc comprises opposite outside and inside wall surfaces, and the outer wall surface comprises a first braking surface. The second disc comprises opposite outside and inside wall surfaces, and the inside wall surfaces of the first and second discs confront each other.

The radial ribs extend between the first and second discs and define cooling air passages between the inside wall surfaces of the first and second discs.

The first disc further comprises a raised portion which is raised from the inside wall surface of the first disc toward the second disc, by an amount to increase a wall thickness of the first disc preferably by 10%~40%, and which extends radially from an outer radial position at which an outer circumference of the first braking surface lies, to an intermediate radial position intermediate between the outer radial position and an inner radial position at which an inner circumference of the first braking surface lies. The radial dimension of the raised portion defined between the outer radial position and the intermediate radial position is equal to or greater than $\frac{1}{10}$ of the radial width of the first braking surface between the outer and inner radial positions, and equal to or less than $\frac{1}{2}$ of the radial width of the first braking surface between the outer and inner radial positions.

DETAILED DESCRIPTION OF THE INVENTION

Figure 1:
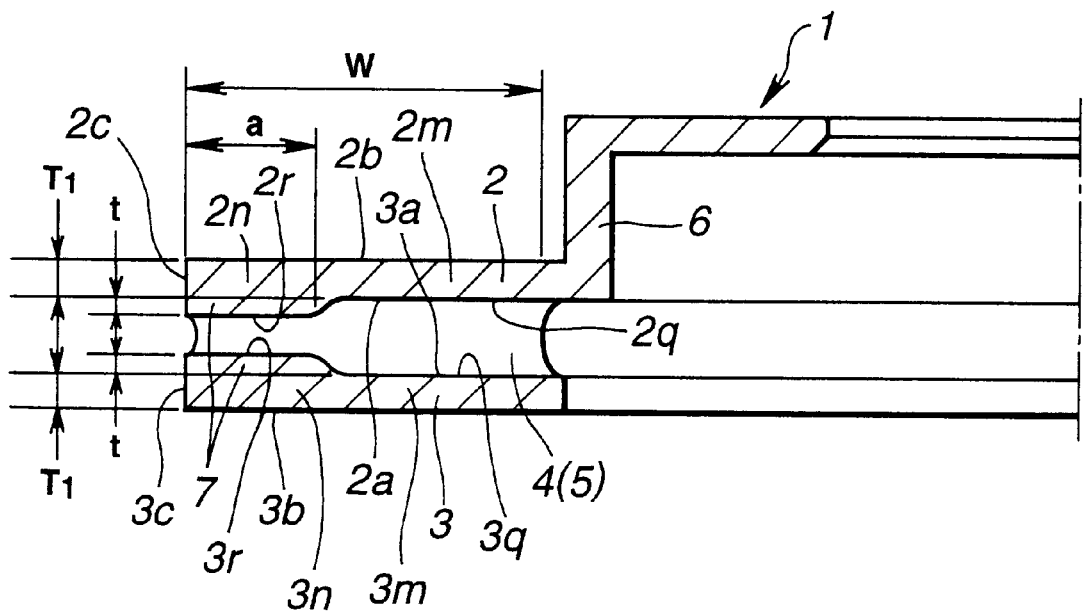
FIG. 1 is a half sectional view showing a ventilated disc brake rotor according to a first embodiment of the present invention.

FIG. 1 shows a cast iron ventilated rotor or disc 1 according to a first embodiment of the present invention.

The ventilated rotor 1 comprises outer (first) and inner (second) discs 2 and 3 separated by a plurality of radial ribs (or fins) 4. In the installed state in which the ventilated rotor 1 is installed as a disc brake in a vehicle, the outer disc 2 is located on an outboard side of the inner disc 3, and the inner disc 3 is located on an inboard side at a predetermined distance away from the outboard disc 2. Between the outer and inner discs 2 and 3, the radial ribs 4 are arranged radially, and extend radially to define a plurality of radially extending cooling air passages 5 each bounded axially between the outer and inner discs 2 and 3 and circumferentially between two adjacent ribs 4. The ventilated rotor 1 shown in FIG. 1 further comprises a central hat section or boss 6 which, in this example, is a central cylindrical protuberance integral with the outer disc 2.

Inside wall surfaces 2a and 3a of the outer and inner discs 2 and 3 confront each other. Outside wall surfaces of the outer and inner discs 2 and 3 comprise outer and inner braking friction surfaces 2b and 3b facing away from each other. In the ventilated rotor 1 of FIG. 1, each of the outer and inner discs 2 and 3 has a raised portion 7 raised from the inside wall surface 2a or 3a of that disc toward the inside wall surface 3a or 2a of the other disc.

In this example, the raised portion 7 of each disc 2 or 3 is annular, and extends circumferentially along the outer periphery of the disc 2 or 3 around the axis of the rotor 1. The raised portion 7 of each disc functions to increase the wall thickness of the disc and to form an outer peripheral thick wall disc section 2n or 3n surrounding an inner thin wall disc section 2m or 3m. The inner thin wall disc section 2m or 3m of each disc is defined axially between the braking friction surface 2b or 3b and a flat inside surface region 2q or 3q of the inside surface 2a or 3a of each disc. The outer thick wall disc section 2n or 3n of each disc is defined axially between the braking friction surface 2b or 3b and a raised inside surface region 2r or 3r of the inside surface 2a or 3a of each disc. In this example, the raised inside surface region 2r or 3r of each disc is substantially flat and parallel to the braking friction surface 2b or 3b of the disc, like the flat inside surface region 2q or 3q. The inner thin wall disc section 2m or 3m of each disc is uniform in wall thickness, and has a uniform wall thickness T1. The wall thickness of the outer thick wall disc section 2n or 3n of each disc is equal to a sum of the thickness T1 of the thin wall disc section 2m or 3m and the thickness t of the raised portion 7. The thickness t is 10~40% of the thickness T1. In this example, T1 is 6 mm, and t is 2 mm.

The raised portion 7 of each disc 2 or 3 extends radially inwardly from the radial position of an outer peripheral end surfaces 2c or 3c of the disc 2 or 3. In this example, the radial dimension (or width) a of the raised portion 7 of each disc 2 or 3 is substantially ⅓ of the (effective) radial width W of the outer and inner braking friction surfaces 2b and 3b. That is, a=(⅓)×W. Thus, the outer and inner braking friction surfaces 2b and 3b are both bounded radially between two coaxial larger and smaller right circular cylindrical surfaces around the common axis of the ventilated rotor 1. The outer peripheral end surfaces 2c and 3c of the outer and inner discs 2 and 3 lie on the imaginary larger cylindrical surface. The raised portions 7 and hence the outer thick wall disc sections 2n and 3n are radially bounded between the imaginary larger cylindrical surface and an imaginary intermediate right circular cylindrical surface which is coaxial with the larger and smaller cylindrical surfaces around the axis of the ventilated rotor 1. The intermediate cylindrical surface is greater in diameter than the smaller cylindrical surface and smaller in diameter than the larger cylindrical surface. The radial dimension a between the imaginary larger and intermediate cylindrical surfaces is substantially equal to one third of the radial dimension W of the outer and inner braking friction surfaces W between the larger and smaller cylindrical surfaces. The radial dimension W is ineffective radial width of the braking friction surface 2b or 3b of each disc, and substantially equal to the radial width of a pad, or the radial width of a contact area between the pad and the braking friction surface.

The outer peripheral thick wall disc section 2n or 3n of each disc can reinforce the outer rim of the disc and increase the heat capacity in the outer peripheral section. Therefore, the outer peripheral thick wall disc section 2n or 3n serves to lower the temperature of the braking friction surface, to decrease the thermal stress in the outer section and to prevent the formation of cracks extending radially inwardly from the outer periphery.

Figure 2:
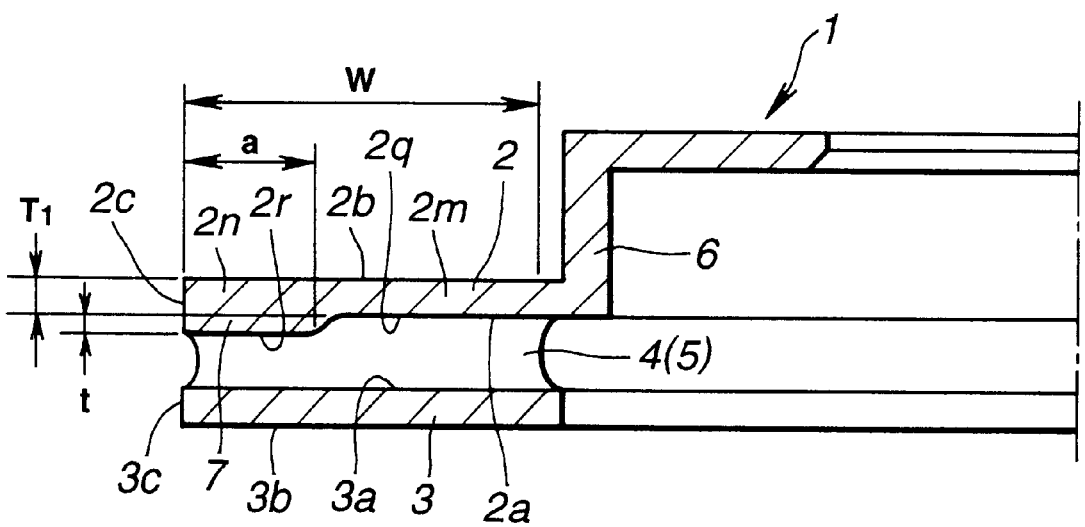
FIG. 2 is a half sectional view showing a ventilated disc brake rotor according to a second embodiment of the present invention.

FIG. 2 shows a ventilated rotor 1 according to a second embodiment of the present invention. In the second embodiment, the raised portion 7 is formed only in the outer disc 2. The raised portion 7 formed in the outer disc 2 is identical in shape and dimensions, to the raised portion 7 of the outer disc 2 shown in FIG. 1. The inner disc 3 of the second embodiment is a disc of uniform wall thickness. The inside wall surface 3a of the inner disc 3 is flat entirely over the radial range between the imaginary larger and smaller cylindrical surfaces. By forming the raised portion 7 only in the outer disc 2 which must endure severer thermal load, the second embodiment can further reduce the weight of the ventilated rotor 1.

Figure 3:
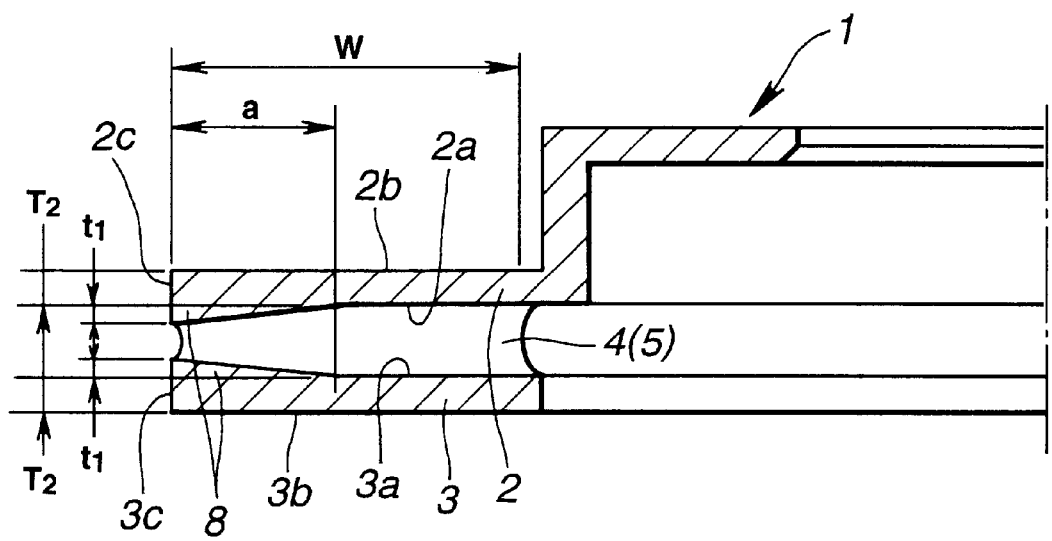
FIG. 3 is a half sectional view showing a ventilated disc brake rotor according to a third embodiment of the present invention.

FIG. 3 shows a ventilated rotor 1 according to a third embodiment of the present invention. In the third embodiment, a raised portion 8 is formed in each of the outer and inner discs 2 and 3 as in the first embodiment. Each of the raised portions 8 of the third embodiment is a tapered portion having a sloping surface. The wall thickness of each disc 2 and 3 decreases gradually from T2+t1 toward an intermediate radial position located radially between the outer radial position of the outer boundary of the braking friction surfaces 2a and 3a and the inner radial position of the inner boundary of the braking friction surfaces 2a and 3a. The thickness t1 of the tapered portion 8 becomes equal to zero at the intermediate radial position. In this example, the intermediate radial position is located substantially at the middle between the outer and inner radial positions. The radial dimension a between the outer and intermediate radial positions is substantially equal to one half of the radial width W of the outer and inner braking friction surfaces 2a and 3a {a=(½)×W}. In this example, the wall thickness T2 of the thin wall disc section is 5 mm, and the thickness t1 of the tapered portion 8 is 2 mm at the outer radial position at which the outer peripheral end surfaces 2c and 3c extends circumferentially around the axis.

Figure 4:
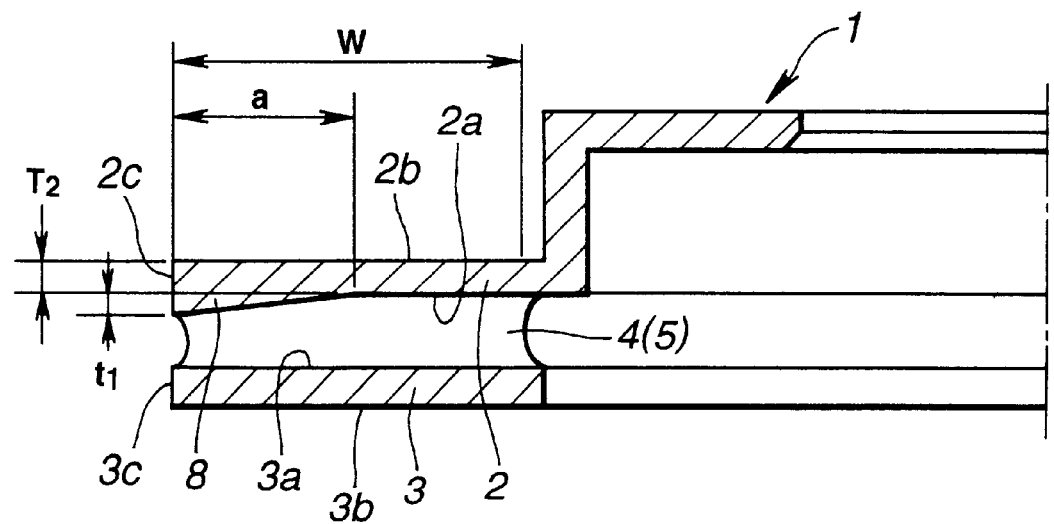
FIG. 4 is a half sectional view showing a ventilated disc brake rotor according to a fourth embodiment of the present invention.

FIG. 4 shows a ventilated rotor 1 according to a fourth embodiment of the present invention. In the fourth embodiment, the tapered portion 8 is formed only in the outer disc 2. The tapered portion 8 formed in the outer disc 2 is identical in shape and dimensions, to the tapered portion 8 of the outer disc 2 shown in FIG. 3. The inner disc 3 of the fourth embodiment is a disc of uniform wall thickness as in the second embodiment of FIG. 2. The inside wall surface 3a of the inner disc 3 is substantially flat entirely over the radial range of the braking friction surfaces 2a and 3a between the imaginary larger and smaller cylindrical surfaces.

Figure 6:
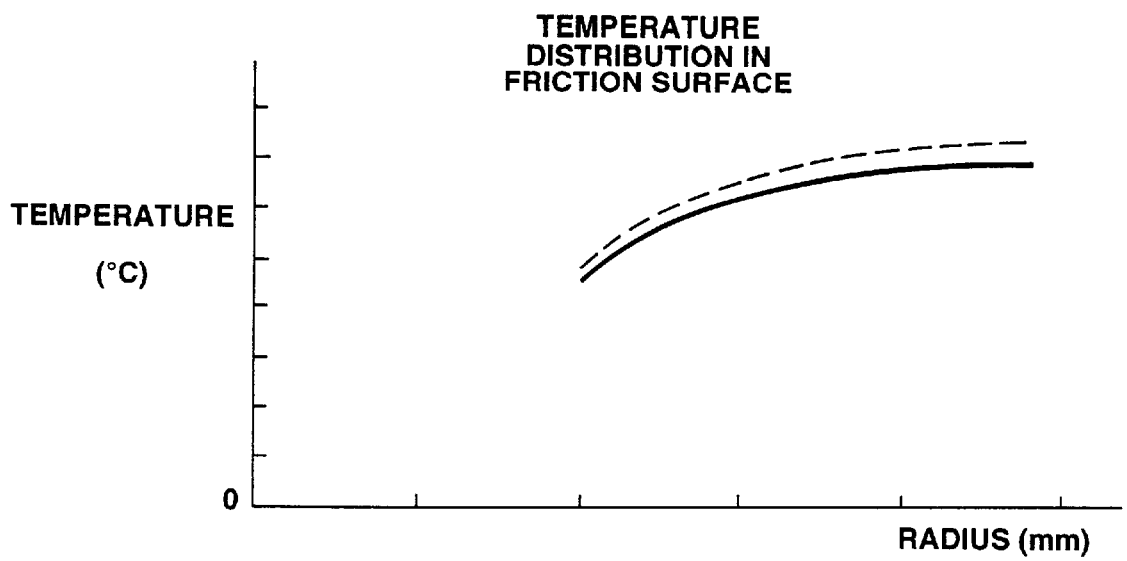
FIG. 6 is a graph showing a temperature distribution along the radial direction in the ventilated disc brake rotor of FIG. 2 in comparison with a comparable example.
Figure 7:
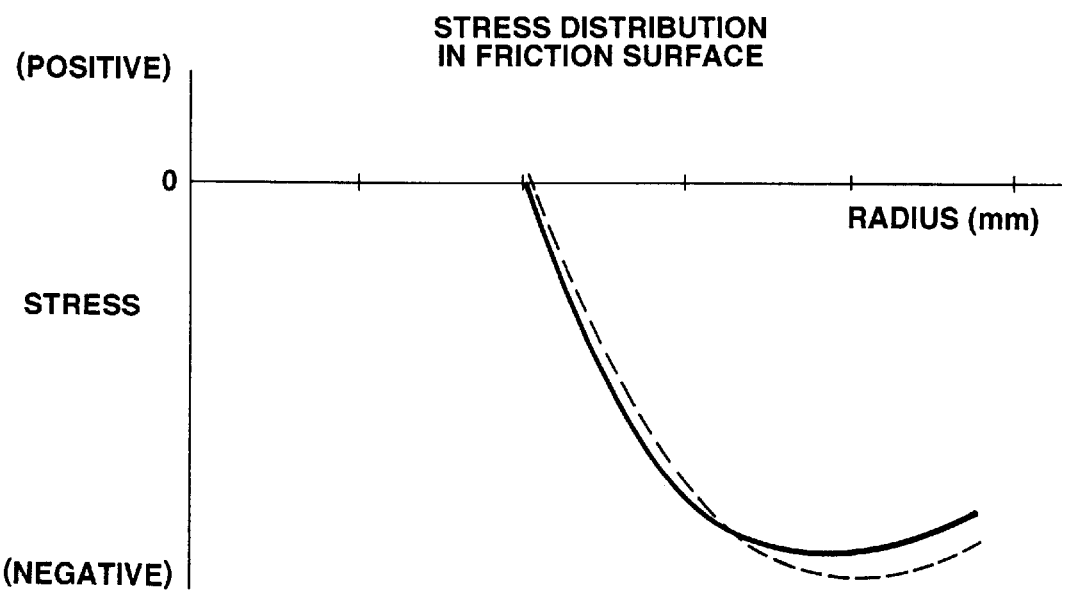
FIG. 7 is a graph showing a stress distribution along the radial direction in the ventilated disc brake rotor of FIG. 2 in comparison with the comparable example.

FIGS. 6 and 7 show the results of endurance test performed by the inventors of this application with a dynamometer on ventilated rotors of the design according to the second embodiment of FIG. 2 and a comparable design of plain discs having no raised portions at all. In FIGS. 6 and 7, solid lines show the results of the present invention, and broken lines show the results of the comparable example. A condition for braking is 210 km/h in terms of vehicle speed.

Figure 5:
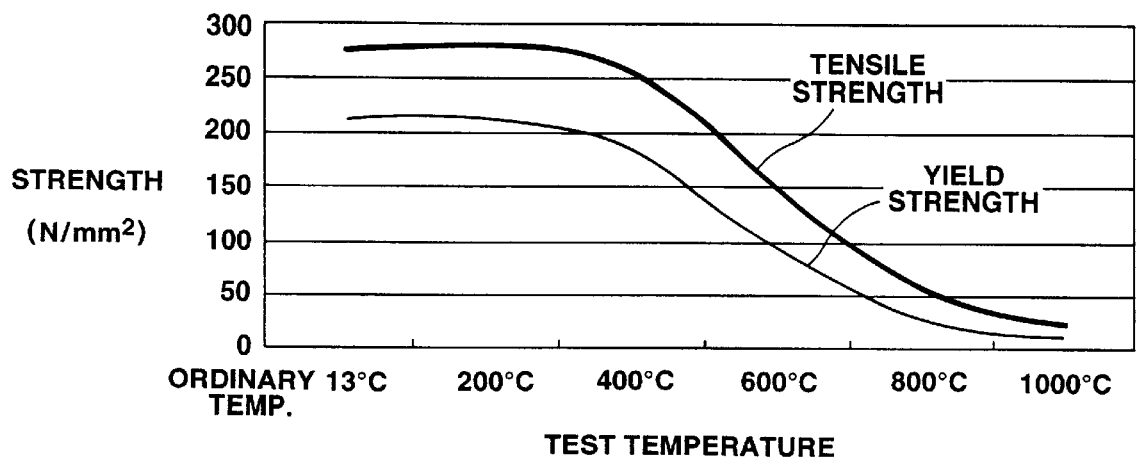
FIG. 5 is a graph showing a temperature-strength characteristic of cast iron which can be used in the present invention.

FIG. 5 is the results of a high temperature tensile test on ordinary cast iron (corresponding to FC250). As evident from the graph of FIG. 5, the tensile strength and yield strength both tend to decrease sharply when the temperature exceeds 400° C. In the disc brake for producing a braking force by converting kinetic energy into thermal energy, therefore, it is desirable to prevent the brake rotor 1 from being heated too much by friction.

FIG. 6 shows temperature distribution along the radial direction from the rotor axis, obtained by temperature measurement at different radial distances (radii) from the rotor axis under the above-mentioned braking condition. In the disc rotor 1 according to the present invention, the temperature increase is restrained, and the amount of restraint increases as the radial distance increases. The raised portion 7 increases the heat capacity and thereby functions to restrain the temperature increase.

FIG. 7 shows thermal stress distribution along the radial direction from the rotor axis, obtained by measurement at different radial distances (radii) from the rotor axis. The stress turns negative (compressive stress) at a position of about 90 mm in both the disc rotors of the present invention and the comparable example. In a range of the radial distance over about 120 mm, the stress is significantly lower in the present invention than in the comparable example. The brake rotor 1 according to the present invention is superior in preventing thermal fatigue cracks due to thermal stress.

Thus, the raised portions 7 and 8 of the preceding embodiments can improve the rotor's heat withstanding capability.

Figure 8:
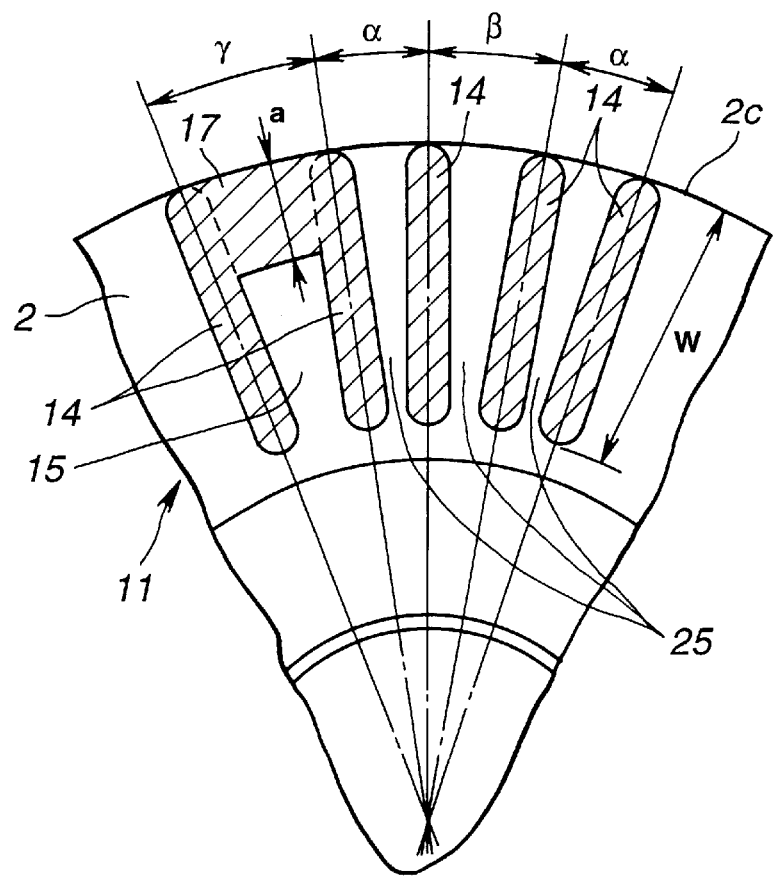
FIG. 8 is a partial sectional view showing a ventilated disc brake rotor according to a fifth embodiment of the present invention, taken across a line F8—F8 in FIG. 9.
Figure 9:
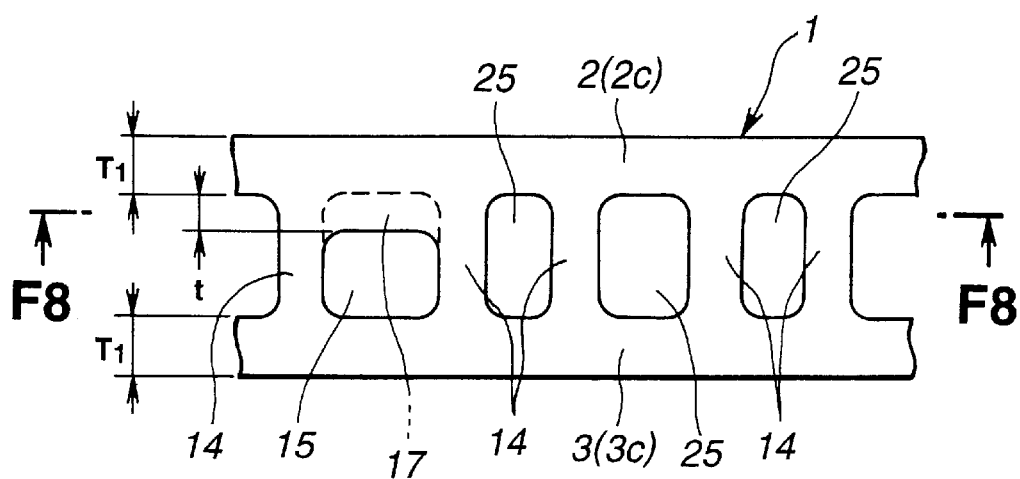
FIG. 9 is an end view showing the ventilated disc brake rotor of FIG. 8.

FIGS. 8 and 9 show a ventilated disc brake rotor 11 according to a fifth embodiment of the present invention. In the fifth embodiment, a plurality of radial ribs 14 are arranged at unequal angular pitches between outer and inner discs 2 and 3.

As shown in FIG. 8, each rib 14 extends radially. The inner and outer ends of each rib 14 are rounded in the sectional shape. In the example of FIG. 8, there are three different pitch angles $\alpha$, $\beta$ and $\gamma$ ($\alpha \leqq \beta < \gamma$). Therefore, there are wide cooling air passages 15 and narrow cooling air passages 25. Each of the wide cooling air passages 15 is bounded circumferentially between two adjacent ribs 14 separated at the pitch angle (or angular distance) $\gamma$. Each of the narrow cooling air passages 25 is bounded circumferentially between two adjacent ribs 14 separated at the pitch angle (or angular distance) $\alpha$ or $\beta$. In this example, a raised portion 17 is formed only in the outer disc 2, and formed, under the conditions of FIG. 2, only in the wide cooling air passages 15 of the largest pitch angle $\gamma$. In this example, $\alpha=8°$, $\beta=10°$ and $\gamma=12°$. The raised portion 17 formed in each of the wide cooling air passages 15 has a thickness t, the thin wall section of the outer disc 2 has a uniform wall thickness T1, and t=T1×0.1~0.4. Each raised portion 17 extends from the outer periphery of the outer disc 2 radially toward the axis of the rotor, and the radial width a of each raised portion 17 is approximately one third of the radial width W of the outer braking friction surface 2b {a=(⅓)×W}. In the example of FIG. 8, the radial width W is equal to a radial dimension of the ribs 14.

Figure 10:
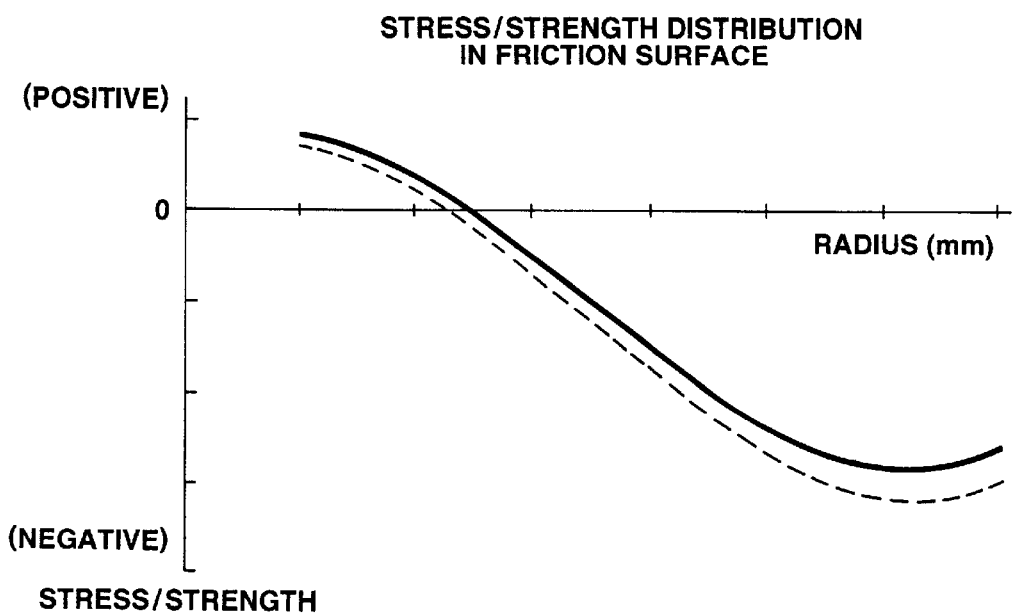
FIG. 10 is a graph showing a stress/strength distribution along the radial direction in the ventilated disc brake rotor shown in FIGS. 8 and 9.

FIG. 10 shows distribution of the yield strength estimated in terms of a ratio of stress to strength (stress/strength) along the radial direction of the ventilated rotor shown in FIG. 8 and 9. The characteristic according to the present invention shown by a solid line is superior to that of the comparable example shown by a broken line in FIG. 10.

The fifth embodiment can further reduce the weight and efficiently prevent cracks in the wide cooling air passages which are liable to suffer stress concentration.

Figure 11:
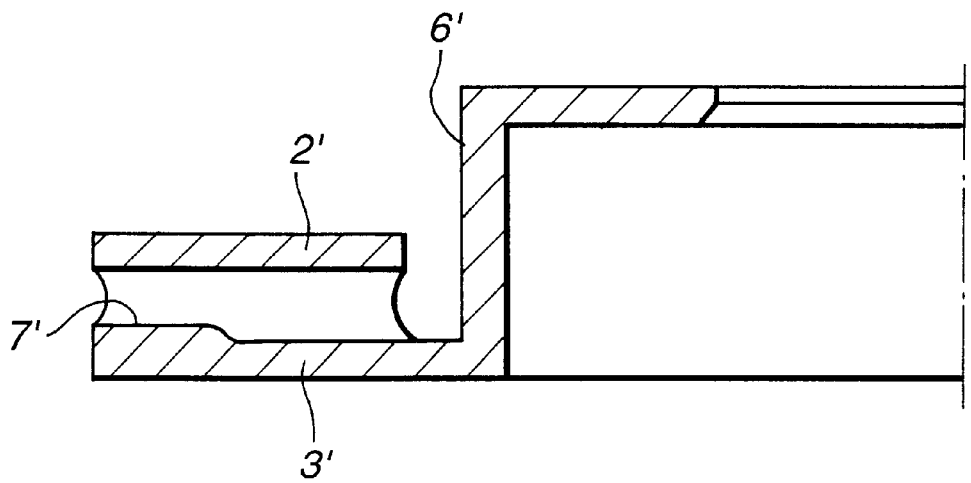
FIG. 11 is a half sectional view showing a ventilated disc brake rotor according to a sixth embodiment.

FIG. 11 shows a ventilated rotor according to a sixth embodiment of the present invention. The ventilated rotor comprises outer (second) disc 2' and inner (first) disc 3'. In this embodiment, the inner disc 3' comprises a central hat section 6' projecting, in an outward direction from the inner disc 3' to the outer disc 2', through a center hole of the outer disc 2', beyond the outer disc 2'. The central hat section is adapted for fixing to a road wheel of a vehicle. In the example of FIG. 11, a raised portion 7' similar to the raised portion 7 of FIG. 2 is formed only in the inner (first) disc 3'.

It is optional to form the raised portion 7' in each of the outer and inner discs 2' and 3' like the design of FIG. 1.

Figure 12:
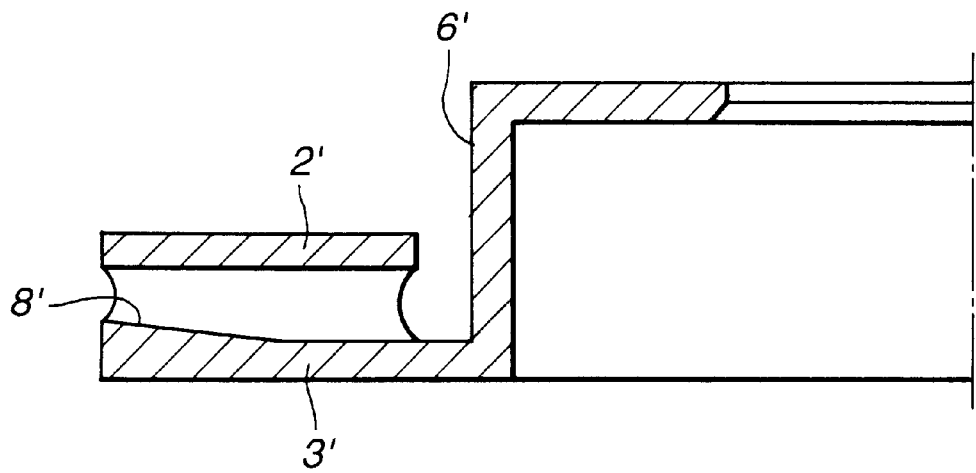
FIG. 12 is a half sectional view showing a ventilated disc brake rotor according to a seventh embodiment.

FIG. 12 shows a ventilated rotor according to a seventh embodiment. The outer (second) disc 2' and inner (first) disc 3' are similar to the outer and inner discs 2' and 3' shown in FIG. 11. A raised tapered portion 8' similar to the taper portion 8 of FIG. 4 is formed only in the inner (first) disc 3' having the central hat section 6' adapted to be fixed to a vehicle road wheel.

It is optional to form the taper portion 8' in each of the outer and inner discs 2' and 3' like the design of FIG. 3.

Figure 13:
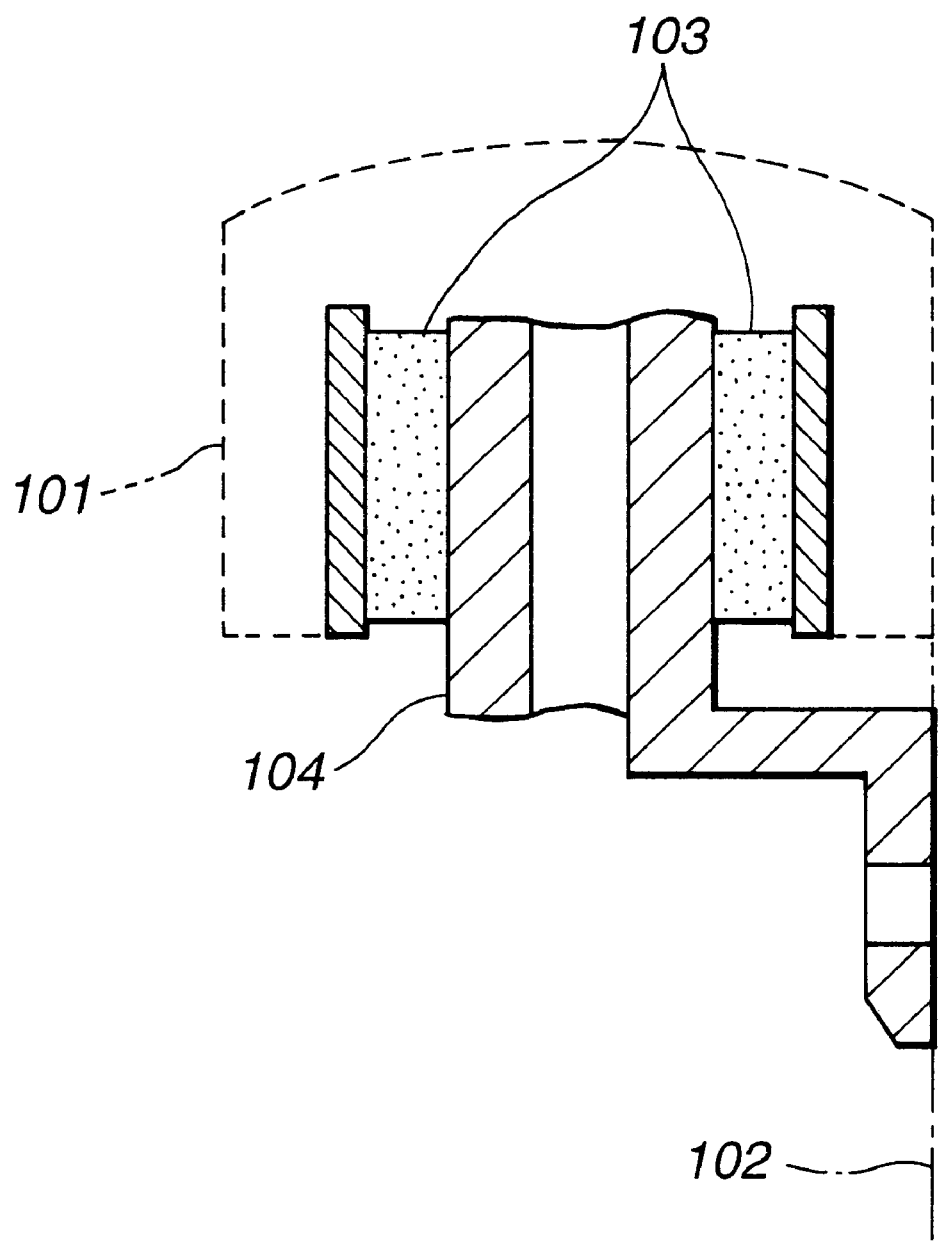
FIG. 13 is a sectional view showing a part of a conventional disk brake.

FIG. 13 shows a conventional ventilated disc brake comprising a ventilated rotor 104 having outer and inner plain discs, a pair of friction pads 103 on both sides of the rotor 104, and a brake caliper 101 for bringing the brake friction pads 103 to bear on the opposite brake friction surfaces of the rotor 104 fixed to a road wheel 102. In this disc brake, the radial dimension W is an effective radial width of the brake friction surface of at least one disc of the rotor 104, and substantially equal to the radial width of at least one pad 103, or the radial width of an effective contact area between the pad and the braking friction surface. In the example of FIG. 11, the effective radial width of the brake friction surface of one of the outer and inner discs of the rotor 104 is equal to that of the other disc.

The invention is not limited to the embodiments described and illustrated above. Modifications and variations of the embodiments described above will occur to those skilled in the art in light of the above teachings.

What is claimed is:

1. A ventilated disc brake rotor comprising: a first disc comprising opposite outside and inside wall surfaces, the outer wall surface comprising a first braking surface;

a second disc comprising opposite outside and inside wall surfaces, the inside wall surfaces of the first and second discs confronting each other; and a plurality of radial ribs extending between the first and second discs and defining cooling air passages between the inside wall surfaces of the first and second discs;

wherein the first disc comprises a raised portion which is raised from the inside wall surface of the first disc toward the second disc, by an amount to increase a wall thickness of the first disc by 10%~40%, and which extends radially from an outer radial position at which an outer circumference of the first braking surface lies, to an intermediate radial position intermediate between the outer radial position and an inner radial position at which an inner circumference of the first braking surface lies, a radial dimension of the raised portion defined between the outer radial position and the intermediate radial position being equal to or greater than ¹⁄₁₀ of a radial width of the first braking surface between the outer and inner radial positions and equal to or less than ½ of the radial width of the first braking surface between the outer and inner radial positions and wherein the inside wall surface of the first disc comprises a flat region extending substantially in parallel to the first braking surface, radially from the intermediate radial position to the inner radial position.

2. The ventilated disc brake rotor of claim 1 wherein the first disc comprises a hat section.

3. The ventilated disc brake rotor of claim 1 wherein the raised portion is annular and extends around an axis of the ventilated disc brake rotor.

4. The ventilated disc brake rotor of claim 1 wherein the outside wall surface of the second disc comprises a second braking surface, the second disc comprises a raised portion which is raised from the inside wall surface of the second disc toward the first disc, by an amount to increase a wall thickness of the second disc by 10%~40%, and which extends radially from an outer radial position at which an outer circumference of the second braking surface lies, to an intermediate radial position intermediate between the outer radial position of the second braking surface and an inner radial position at which an inner circumference of the second braking surface lies, a radial dimension of the raised portion defined between the outer radial position and the intermediate radial position of the second disc being equal to or greater than ¹⁄₁₀ of a radial width of the second braking surface between the outer and inner radial positions of the second disc and equal to or less than ½ of the radial width of the second braking surface between the outer and inner radial positions of the second disc.

5. The ventilated disc brake rotor of claim 4 wherein the raised portions of the first and second discs are both annular and extend around an axis of the ventilated disc brake rotor, and the radial dimensions of the raised portions of the first and second discs are substantially equal to each other.

6. The ventilated disc brake rotor as claimed in claim 1 wherein the raised portion is formed only in the first disc, and the second disc has no raised portion raised toward the first disc, and wherein the first disk comprises a central hat section.

7. The ventilated disc brake rotor as claimed in claim 1 wherein the raised portion is tapered so that the wall thickness of the first disc decreases gradually from the outer radial position to the intermediate radial position.

8. The ventilated disc brake rotor as claimed in claim 2 wherein the radial ribs are arranged around an axis of the ventilated disc brake rotor at unequal pitches, and the raised portion is formed in a region having a largest pitch.

9. The ventilated disc brake rotor as claimed in claim 2 wherein the radial ribs are arranged around an axis of the ventilated disc brake rotor at unequal pitches, the cooling air passages comprises narrower passages and wide passages each of which is wider than any one of the narrower passages, the raised portion is formed only in the wide passages.

10. The ventilated disc brake rotor comprising:
a second disc bounded axially between opposite outside and inside wall surfaces;
a first disc bounded axially between opposite outside and inside wall surfaces, the inside wall surface of the first disc confronting the inside wall surface of the second disc, the outside wall surface of the first disc comprising a first brake friction surface bounded radially between an imaginary smaller cylindrical surface and an imaginary larger cylindrical surface coaxially surrounding the imaginary smaller cylindrical surface, the first disc comprising a central hat section; and
a plurality of radial ribs extending between the first and second discs and defining cooling air passages between the inside wall surfaces of the first and second discs;
wherein the first disc comprises a thin wall section defined axially between the first braking surface and the inside wall surface of the first disc and an outer thick wall section extending radially from the imaginary larger cylindrical surface to an imaginary intermediate cylindrical surface which is coaxial with the imaginary larger and smaller cylindrical surfaces and intermediate between the imaginary larger and smaller cylindrical surfaces, the outer thick wall section of the first disc is greater in wall thickness than the thin wall section of the first disc, a radial distance of the outer thick wall section defined between the imaginary larger cylindrical surface and the imaginary intermediate cylindrical surface is substantially equal to or greater than one third of a radial width of the first brake friction surface defined between the imaginary larger and smaller cylindrical surfaces, and is substantially equal to or smaller than half of the radial width of the first brake friction surface between the imaginary larger and smaller cylindrical surfaces; and
wherein the thin wall section of the first disc comprises an inner section of uniform wall thickness which extends radially inwardly from the imaginary intermediate cylindrical surface to the imaginary smaller cylindrical surface, and which is bounded axially between the first brake friction surface and a flat inside surface region of the inside wall surface of the first disc, and the thick wall section is bounded axially between the first brake friction surface and a raised inside surface region of the inside wall surface of the first disc, the flat inside surface region of the first disc being substantially flat and parallel to the first brake friction surface, the raised inside surface region of the first disc being raised toward the second disc from the flat inside surface region of the inside wall surface of the first disc.

11. The ventilated disc brake rotor of claim 10 wherein a wall thickness of the outer thick wall section is greater than a wall thickness of the thin wall section by a percentage in a range of 10%~40%.

12. The ventilated disc brake rotor of claim 10 wherein the raised inside surface region of the inside wall surface of the first disc is inclined with respect to the first brake friction surface so that the wall thickness of the thick wall section of the first disc decreases gradually from the imaginary larger cylindrical surface to the imaginary intermediate cylindrical surface.

13. The ventilated disc brake rotor of claim 10 wherein the outside wall surface of the second disc comprises an second brake friction surface bounded radially between the imaginary larger and smaller cylindrical surfaces, and wherein the second disc comprises a thin wall section defined between the inner braking surface and the inside wall surface of the second disc and an outer thick wall section extending radially from the imaginary larger cylindrical surface to the imaginary intermediate cylindrical surface which is smaller in diameter than the imaginary larger cylindrical surface and greater in diameter than the smaller cylindrical surface, the outer thick wall section of the second disc is greater in wall thickness than the thin wall section of the second disc, a radial distance of the outer thick wall section of the second disc defined between the imaginary larger cylindrical surface and the imaginary intermediate cylindrical surface is equal to or greater than one third of a radial width of the inner brake friction surface defined between the imaginary larger and smaller cylindrical surfaces, and is equal to or smaller than half of the radial width of the second brake friction surface between the imaginary larger and smaller cylindrical surfaces.

14. The ventilated disc brake rotor of claim 13 wherein the thin wall section of the second disc comprises an inner section of uniform wall thickness which extends radially inwardly from the imaginary intermediate cylindrical surface to the imaginary smaller cylindrical surface, and which is bounded axially between the inner brake friction surface and a flat inside surface region of the inside wall surface of the second disc, and the thick wall section is bounded axially between the second brake friction surface and a raised inside surface region of the inside wall surface of the second disc, the flat inside surface region of the second disc being substantially flat and parallel to the second brake friction surface, the raise inside surface region of the second disc is raised toward the first disc from the flat inside surface region of the inside wall surface of the second disc, the raised inside surface regions of the inside wall surfaces of the first and second discs are substantially symmetrical so that one is a mirror image of the other with respect to an imaginary medial plane extending radially between the raised inside surface regions of the inside wall surfaces of the first and second discs.

15. The ventilated disc brake rotor of claim 10 wherein the second disc is substantially uniform in wall thickness over a radial range of the second braking surface between the imaginary larger and outer cylindrical surfaces.

16. The ventilated disc brake rotor of claim 10 wherein the thin wall section and the thick wall section of the first disc are both annular, and the thick wall section of the first disc surrounds the thin wall section of the first disc.

17. The ventilated disc brake rotor of claim 10 wherein the radial ribs are arranged around an axis of the rotor at unequal angular pitches, the cooling air passages comprises narrow passages and wide passages each of which is wider than any one of the narrow passages, and the thick wall section of the first disc is formed only in the wide passages.

18. A ventilated disc brake rotor comprising:

a second disc bounded axially between opposite outside and inside wall surfaces;

a first disc bounded axially between opposite outside and inside wall surfaces, the inside wall surface of the first disc confronting the inside wall surface of the second disc, the outside wall surface of the first disc comprising a first brake friction surface bounded radially between an imaginary smaller cylindrical surface and an imaginary larger cylindrical surface coaxially surrounding the imaginary smaller cylindrical surface, the first disc comprising a central hat section; and a plurality of radial ribs extending between the first and second discs and defining cooling air passages between the inside wall surfaces of the first and second discs;

wherein the first disc comprises a thin wall section defined axially between the first braking surface and the inside wall surface of the first disc and an outer thick wall section extending radially from the imaginary larger cylindrical surface to an imaginary intermediate cylindrical surface which is coaxial with the imaginary larger and smaller cylindrical surfaces and intermediate between the imaginary larger and smaller cylindrical surfaces, the outer thick wall section of the first disc is greater in wall thickness than the thin wall section of the first disc, a radial distance of the outer thick wall section defined between the imaginary larger cylindrical surface and the imaginary intermediate cylindrical surface is substantially equal to or greater than one third of a radial width of the first brake friction surface defined between the imaginary larger and smaller cylindrical surfaces, and is substantially equal to or smaller than half of the radial width of the first brake friction surface between the imaginary larger and smaller cylindrical surfaces;

wherein the thin wall section of the first disc comprises an inner section of uniform wall thickness which extends radially inwardly from the imaginary intermediate cylindrical surface to the imaginary smaller cylindrical surface, and which is bounded axially between the first brake friction surface and a flat inside surface region of the inside wall surface of the first disc, and the thick wall section is bounded axially between the first brake friction surface and a raised inside surface region of the inside wall surface of the first disc, the flat inside surface region of the first disc being substantially flat and parallel to the first brake friction surface, the raised inside surface region of the first disc being raised toward the second disc from the flat inside surface region of the inside wall surface of the first disc; and wherein, the raised inside surface region of the inside wall surface of the first disc is substantially flat and parallel to the first brake friction surface so that the wall thickness of the thick wall section of the first disc is substantially uniform from the imaginary larger cylindrical surface to the imaginary intermediate cylindrical surface.

19. A ventilated disc brake rotor comprising:

a first disc bounded between a first brake friction surface and an inside wall surface, the first disc comprising a central hat section;

a second disc bounded between a second brake friction surface facing away from the first disc and an inside wall surface confronting the inside wall surface of the first disc; and a plurality of radial ribs which extend between the first and second discs and which define profiled cooling air passages each extending radially outwardly from an inner opening to an outer opening, each of the profiled cooling air passages being defined circumferentially between adjacent two of the radial ribs, and defined axially between a profiled first stripe region which is a region of the inside wall surface of the first disc and a second stripe region which is a region of the inside wall surface of the second disc, the first and second stripe regions in each profiled air passage extend radially from the inner opening to the outer opening of that profiled air passage, the profiled outer stripe region of each of the profiled air passages comprises an inner subregion extending in parallel to the first braking friction surface from the inner opening of the profiled air passage to an intermediate position, and an outer subregion which extends from the outer opening of the profiled air passage to an intermediate position located radially between the outer and inner openings of the profiled air passage, and which is raised from the inside wall surface of the first disc toward the second disc so as to increase a thickness of the first disc between the first brake friction surface and the outer subregion, a radial dimension of the outer subregion between the outer opening and the intermediate position in each of the profiled air passages is equal to or greater than $\frac{1}{10}$ of a radial distance between the inner and outer openings of the profiled air passage, and is equal to or smaller than $\frac{1}{2}$ of the radial distance between the inner and outer openings of the profiled air passage.

20. The ventilated disc brake rotor of claim 19 wherein the radial ribs further define plain air passages bounded axially between a plain first stripe region which is a region of the inside wall surface of the first disc and a plain second stripe region which is a region of the inside wall surface of the second disc, the plain first and second stripe regions in each plain air passage extend radially in parallel to each other from the inner opening to the outer opening of that plain air passage, and the profiled and plain air passages are arranged symmetrically around an axis of the rotor.

* * * * *